(12) United States Patent
Yuksel Turgut et al.

(10) Patent No.: US 11,343,350 B2
(45) Date of Patent: May 24, 2022

(54) USE FREQUENCY-BASED COOPERATIVE CACHING METHOD FOR MULTI-LAYER NETWORK STRUCTURES (E.G. 5G)

(71) Applicant: HAVELSAN HAVA ELEKTRONIK SANAYI VE TICARET ANONIM SIRKETI, Ankara (AR)

(72) Inventors: Ayse Melda Yuksel Turgut, Ankara (AR); Tolga Girici, Ankara (AR); Furkan Kucuk, Ankara (AR); Mustafa Kagan Cetin, Ankara (AR)

(73) Assignee: HAVELSAN HAVA ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 17/413,588

(22) PCT Filed: Dec. 29, 2019

(86) PCT No.: PCT/TR2019/051240
§ 371 (c)(1),
(2) Date: Jun. 14, 2021

(87) PCT Pub. No.: WO2020/142046
PCT Pub. Date: Jul. 9, 2020

(65) Prior Publication Data
US 2022/0078258 A1 Mar. 10, 2022

(30) Foreign Application Priority Data
Dec. 31, 2018 (TR) .................................. 2018/21380

(51) Int. Cl.
*G06F 15/173* (2006.01)
*H04L 67/5682* (2022.01)
(Continued)

(52) U.S. Cl.
CPC ...... *H04L 67/2852* (2013.01); *H04L 67/2842* (2013.01); *H04L 67/2885* (2013.01)

(58) Field of Classification Search
CPC ............. H04L 67/2842; H04L 67/2852; H04L 67/2885
(Continued)

(56) References Cited

U.S. PATENT DOCUMENTS

| 5,944,780 A | 8/1999 | Chase et al. |
| 9,948,742 B1 | 4/2018 | Bueche et al. |

(Continued)

FOREIGN PATENT DOCUMENTS

| CN | 106028400 A | 10/2016 |
| EP | 2750447 A1 | 7/2014 |

(Continued)

*Primary Examiner* — Johnny B Aguiar
(74) *Attorney, Agent, or Firm* — Bayramoglu Law Offices LLC

(57) ABSTRACT

A method for caching most-frequently requested contents by users in a multi-layer network structure in a bottom layer of a network, wherein the bottom layer of the network includes access points and base stations and for providing a fastest access to files by changing a node connected by a user by performing a content-based handover by directing the user to a point comprising a requested content, wherein the method is based upon a concept of storing files, wherein the files are in high demand in a geographical region, in a cached manner on a basis of cooperation between the base stations that are in juxtaposition to one another. In the method, a group of close-proximity nodes are grouped, and the group of close-proximity nodes ensured to perform user handover therebetween.

1 Claim, 3 Drawing Sheets

(51) Int. Cl.
  *H04L 67/568* (2022.01)
  *H04L 67/2885* (2022.01)
(58) Field of Classification Search
  USPC ............................... 709/217, 219, 223, 224
  See application file for complete search history.

(56) References Cited

U.S. PATENT DOCUMENTS

| | | |
|---|---|---|
| 2003/0009538 A1 | 1/2003 | Shah et al. |
| 2003/0187935 A1 | 10/2003 | Agarwalla et al. |
| 2012/0102141 A1* | 4/2012 | Burckart ............... H04M 15/00 |
| | | 709/217 |
| 2012/0151044 A1 | 6/2012 | Luna et al. |
| 2013/0013726 A1* | 1/2013 | Westberg ............ H04L 67/2847 |
| | | 709/213 |
| 2014/0153504 A1* | 6/2014 | Wang .................... H04L 67/289 |
| | | 370/329 |
| 2015/0142914 A1* | 5/2015 | Lau ..................... H04L 67/2842 |
| | | 709/217 |
| 2016/0100350 A1* | 4/2016 | Laraqui ................ H04L 67/327 |
| | | 370/328 |
| 2018/0069751 A1 | 3/2018 | Guo et al. |

FOREIGN PATENT DOCUMENTS

| | | |
|---|---|---|
| WO | 2016165524 A1 | 10/2016 |
| WO | 2017063670 A1 | 4/2017 |
| WO | 2017108070 A1 | 6/2017 |
| WO | 2017152486 A1 | 9/2017 |

* cited by examiner

USE FREQUENCY-BASED COOPERATIVE CACHING METHOD FOR MULTI-LAYER NETWORK STRUCTURES (E.G. 5G)

CROSS REFERENCE TO THE RELATED APPLICATIONS

This application is the national stage entry of International Application No. PCT/TR2019/051240, filed on Dec. 29, 2019, which is based upon and claims priority to Turkish Patent Application No. 2018/21380 filed on Dec. 31, 2018, the entire contents of which are incorporated herein by reference.

TECHNICAL FIELD

The inventive method relates to a collaborative caching model for multi-layer network structures. Accordingly, frequently used contents are kept in the cache at various layers of the network and are presented to user without moving upwardly the entire network path. The inventive method offers a novel solution for which content will be stored at which point and for which of those paths will be selected, in case there are multiple paths when presenting the stored content to the user.

BACKGROUND

The problem of being unable to rapidly transfer data to users has been the subject of many studies for a long time. For that purpose, the caching method are tried to be used in various manners, however a permanent result could not be provided. In this context, related documents are as follows so as to provide a better understanding of the invention.

The U.S. Pat. No. 5,944,780 discloses a caching method for network structures. This patent is of importance in terms of being one of the first and primary applications in the caching subject. Accordingly, the online node reports the contents in its cache to the center and when these contents are requested, firstly it is checked whether the local network comprises the node keeping this content, if it is available, the user is directed to this node. There is neither information nor recommendation for where the cache will be kept, how the user is going to reach this cache and similar subjects.

The U.S. Pat. No. 9,948,742 discloses a system that determines contents to be cached in user at service provider sides. This caching is for user himself/herself and cannot be shared with anyone. It is not considered a similar with the inventive method, since it does not provide a recommendation for collaborative caching and content distribution.

The US patent application numbered US2018069751 discloses a caching system for objects stored on a cloud, however it cannot provide a solution since it does not offer a recommendation for use frequency and collaborative caching. Moreover, it is silent on where the cache will be kept. Since it does not present a recommendation for which node will hold which content, it is not regarded as similar with the inventive method.

In the Patent Cooperation Treaty (PCT) application numbered WO2016165524, response to http-based content request of the user should be sent by base station, if such information is available in the base station. However, there is neither information on a collaborative caching between base stations nor a method for a content allocation to caches.

In the PCT application numbered WO2017108070, it is foreseen a cache for micro base stations and to present files kept in the cache for use by way of fragmenting files as well as to present them in a fragmented manner. It provides neither solution in terms of many aspects nor a recommendation for a collaborative caching.

In the Canadian patent application numbered CN106028400, it is disclosed a distributed mechanism applied in base station. Accordingly, if the content request is unavailable, there is a loss. The gain resulting from saving this content in the cache is calculated, then it is recommended to cache in case the gain is more than the loss. However, performing such calculations in base station cause various technical problems. Furthermore, since it is not possible to reach the use speed achieved with a collaborative caching by means of these methods, it is not considered as similar with the inventive method.

In the European patent application numbered EP2750447, it is foreseen to accelerate data transfer on the mobile network by means of a handover mechanism. Accordingly, the content is cached at certain border nodes in a close proximity to base stations. In case of a base station change due to signal attenuation, the closest base station is picked among candidate base stations and user is directed to this base station. However, it is not considered as similar with the inventive method, since it does not provide any recommendation for locating the contents consciously and by considering the possible handovers and for performing a handover to the base station comprising the content, even though the present base station has a very good signal.

In the PCT application numbered WO2017063670, a macro base station fragments the available files and distributes these fragments to micro base stations connected with itself. It is herein the aim to minimize the background payload. This optimization is carried out according to popularity of the files. It is known that this invention also can be found in various non-patent publications. The inventive performs a coded caching for energy efficiency. Said document foresees that the file is decomposed into different fragments and saved in a coded manner in the form of decomposed fragment. Here, there occurs various technical problem at the coding and then caching point, and it can be given as an example for a collaborative caching. However, it is obvious that it is not referred to content-based handover of base stations throughout the document. It relates to a solution for a technical problem similar to the problem that the inventive method, however it provides absolutely different solution. The above-mentioned invention does not provide a grouping-based solution as the inventive method does.

In the PCT application numbered WO2017152486, it is disclosed a cache separated into different hierarchical levels. Accordingly, even though it is foreseen a content popularity-based caching, this is distributed vertically. Accordingly, while it is foreseen that contents considered as the most popular are at the closest level (base station) to user, it is foreseen that less popular contents should be upper layers of the network. Herein, it is not possible to refer to a collaborative caching and horizontal orientation.

SUMMARY

The inventive method is a method for caching the most-frequently requested contents by users in a multi-layer network structure in the bottom layer of the network (e.g. access points, base stations) and for providing the fastest access to files by way of changing the node connected by user by performing a content based handover by means of directing user to the point that comprises the requested content, wherein the inventive method is based upon the concept of storing files which are in high demand in a geographical region, in a cached manner on the basis of cooperation between base stations that are in juxtaposition to one another. In the inventive method, a group of close-proximity nodes are grouped, and it is ensured to perform user handover therebetween. It is not necessary to know or predict content popularities in advance so as to implement this method.

Technical Problem

The procedure performed normally in multi-layer networks is as follows; when user request a content, every network layer directs the user to the direction comprising the content at an upper layer and ensures to follow a path that ends at the server where the content is kept. Thus, user request the content from server and the content returns by following the same (or similar, in rare occasions) path between each layer. This method is the main reason of the limit in the content supply speed. Since this method also is a multi-layer structure, content request and supply speed are determined by the slowest one of those layers. Particularly, that the multi-later network structures are stuck at certain points results in the decrease of speed of use. Furthermore, it also leads to a great number of requests waiting to be requested before the server a great number of empty files waiting to be sent. The problem, to which the inventive method brings a solution, is the problem with moving a long path. Instead of that, a technical solution is presented for a technical problem by means of caching the content requested in great numbers from the same nodes at the lower levels of the multilayer network structure and directing the user to the nodes to which the content is cached.

DETAILED DESCRIPTION

Solution to Problem

Figure 1:
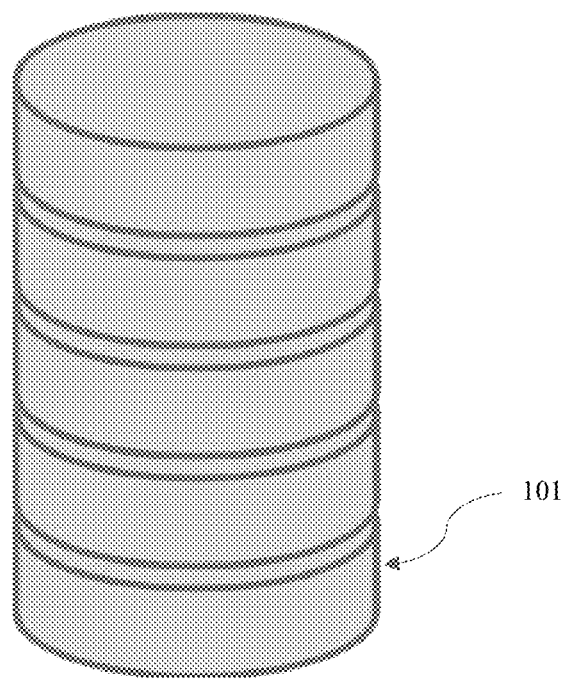
FIG. 1 illustrates a diagram of fragmental cache concept.

Nowadays, users request data over certain platforms and users that are in a close distance geographically request the same content repeatedly. This results from a number of reasons and leads to a traffic, of which magnitude increases exponentially in the network structure. Every user firstly is directed to the bottom level station, then is directed to the upper layers by connecting one by one, he/she reaches the server containing the file as a result of those directions and requests for the related content and said content generally returns through a path with an equal length and reaches to the user again. For example, if a content having a great importance for a community (e.g. crowd in a stadium) is desired to be watched for ten thousand times through wireless communication paths, ten thousands of request reaches to the station, herein they are directed between network layers and then to the server containing the content, ten thousand of responses received go through network layers from the server and distributed to users over base station. The content mentioned in this example may be a video file, an internet site file HyperText Markup Language (html) or Hypertext Preprocessor (php), a picture file, a voice file, a file with different format or a mixture thereof.

Upon the population of particularly use of mobile internet nowadays, the number of such contents increase day by day, users request similar contents in great numbers, and they increase the traffic payload sometimes up to the troublesome points to handle. Popular news is read by millions in a short time, video contents are requested by millions of users and popular images are viewed millions of people. A significant amount of those views is carried out in geographically limited locations and frequency of views sometimes increases in a short period of times at some points.

Even though there are some caching applications to solve this problem practically, these are called as web cache in the internet architecture. Generally, they are applications oriented to solve the traffic problem accumulated before the server and an application is not observed, which performs a caching at the border of the network.

To this end, the inventive method offers a caching application with a five main features; accordingly, said five features are as follow; grouping the access points, co-operating the caching at the grouped access points, triggering the handover according to the state of the available content, performing a cache management without preliminary information or prediction on the content popularity and filling fragments according to certain rules by fragmenting the cache at an access point into different fragments. Thus, it provides a faster use by decreasing the traffic in peak times and intensive regions.

It is necessary to perform a number of arrangements and calculations to carry out the caching without popularity information in the first place; accordingly, it is required to define and use a hit rate. Said hit rate corresponds to information of use of the cached information. Accordingly, the hit rate defines the use rate of the cache and measured through the rate of the request provided by the cache to the total request. As the hit rate increases, the number of links to be connected with the content server within the network arrangement decreases accordingly. The inventive method is divided into four phases for providing a better understanding thereof. There is a Collaborative Caching Entity (CCE) that manages the process for triggering phase transitions. CCE itself also performs caching at the same time.

Phase 0 is a state where every user is connected to the closest access point. As an example, for this case, a wireless network is given that is connected to the base station providing the best services to the user before employing the inventive method. In case user requests a content, there are two cases; in the first case, if the requested content is cached at the access point, it is delivered directly to user from the access point. In the second case, the request unavailable in the cache of the access point is delivered to the content server over CCE and the response received is delivered to the user. The new information going to the access point from the server is subjected to the caching algorithm and then it is decided according to the result whether it would be cached or not. The evaluation or result thereof is decided on the access point by employing said algorithm. CCE, at this stage, directs the content request received from the access point to the content server and when the signal "the cache converged" is given from all access points, it is instructed to proceed the next phase. The cache convergence means that contents of the cache is stabilized and do not change significantly. Access points are able to measure whether their own caches converge or not.

Every user at the phase 1 is able to connect to every access point in close according to the state of content. Access points detect and delete less popular contents in their caches. Herein, the content is directly deleted from the cache depending on the request of the content in a predefined time periods in determining the popularity. In case user requests a content at this point, the requested content is directly delivered to the user in case it is available in the cache at the access point connected. Otherwise, the request is delivered to CCE. At this stage, in case there is a request from any access point, CCE checks whether the content is available at another access point close to the user. If it is available, the user triggers the handover to the access point comprising the content from the present access point and the request is directed to the related access point. If the content requested by the user from the access point are unavailable at related access points, the content in the cache of CCE is directed to the access point. If the content is not available in CCE, then it is requested from the content server. The caching algorithm is triggered for the new content and it is cached or not according to the result of the caching algorithm. If CCE memory is full or converged, the access points are instructed to proceed to Phase 2.

Phase 2 substantially is triggered when CCE cache is full or about to full. Accordingly, every user is able to connect to every close access point. In case user requests a content, one of those two solutions are followed; if the content is found in the cache at the access point connected, it is directly directed to the user. If not, the request is delivered directly to the content server over CCE and the content received from the content server is delivered to the user. The new content is cached or not according to the content caching algorithm. At CCE side, order of the processes are as follow: If a content is requested over a access point, the handover process is triggered and the content is directly directed to the user from the access point by taking over the user by the related access point, in case the content is available at another access point around the user. If the content cannot be found at any of the related access points and available on the cache in CCE, it is directed to the user over the access point from the cache of CCE. If the content is also unavailable in CCE, it is supplied from the content server and is cached or not according to the caching algorithm. When the hit rate of CCE falls below a predetermined value, it is instructed to proceed to Phase 3.

When Phase 3 is proceeded, every user is able to connect to the access point closest to him/herself. If user requests a content, the content is directly directed to the user if it is available at the access point connected. If not, the request is delivered to CCE. Furthermore, the access point reports the hit rate to CCE in a predetermined frequency manner. If an access request is made to CCE, the following processes are performed on CCE; if the content is available at another access point close to user, the handover process is triggered and the user is transferred to the related access point and the content is directly directed to the user. If the content cannot be found at the related access points and is available in CCE, the content in the cache of CCE is delivered to the content access point. In the content is not found in CCE, the content is obtained through the server and the new content is cached or not according to the caching algorithm. At this point, if the hit rate of CCE have exceeded a predetermined certain rate according to the hit rate of the access points, it is instructed to proceed to Phase 0.

Hence, the inventive method defined with four phases in a cycle manner foresees a method for delivering the content requested by the user by passing fewer layers by way of managing each access point, CCEs to which said access points are connected and caches thereof and for keeping a number of contents in the cache so as to perform this. The important point is here that the inventive method performs this by cycling short questions without turning the network into a closed network. While user is able to reach every content that he/she request on the internet without causing an additional delay, he/she also is able to reach the data available in the cache. To this end, it turns the access points in an area into a group, manages them by means of CCE and carries the user to the access point comprising the data by means of handover in case the requested data is available in the cache.

Definitions of some term and abbreviations used in the description for providing a better understanding of the inventive method are as follow; the first point in which user connects to the network in a multi-layer network structure. Said access point on the mobile network is defined as base station. The second layer to which said base stations are connected are internet service suppliers. The third layer is defined as servers to which the internet service suppliers are connected. Herein, the number of said layers may be increased easily by those skilled in the art, when necessary; for example, internet service suppliers already work with multiple layers in itself. Said process array may be operated easily by adding new phases for a network model comprised of four or more layers. In this case, that the intervening elements have caches as the number of layers increases is that user makes the most use of the cache by performing a handover on lower layers. For example, in a four-layer structure, the handover process is maintained such that it is performed at the first, second and third layer and a layer is added to the flowchart given in the accompanying Figures. This process can be performed easily by those skilled in the art.

The expression "the access point close to user" refers to the access point giving the strongest signal to the user, not the physical proximity. In general, though these two concepts are synonymous, it is appropriate to use a signal-based evaluation due to the advantage provided in the state of the art. The handover process is the transmittance of a user to an access point from another. This process is a commonly used process in the art when triggered by the geographical field or signal quality. Accordingly, when user connects to an access point and when user disconnects to an access point after a defined communication between two access points and user, he/she connects to the other simultaneously. This process is a common method used in the state of the art due to various reasons, for example, user moving while connected to mobile network connects to a base station giving a stronger signal when the signal supplied by a station weakens and simultaneously disconnects to the base station previously connected.

The inventive product gathers a group of access point as a group by means of performing the above-mentioned four-phase method and carries out a collaborative caching among them. It also introduces the cache of an upper network layer into said collaborative caching and thus, offers the requested content in a multi-layer network swiftly. In case the network comprises more layers, the same procedure is performed simply starting from the bottom to uppers and again groups and caches among them are created, tests are performed to determine whether the content is available, those available in the cache are presented to user and requests for those unavailable in the cache are delivered to an upper level, thereby providing a collaborative caching.

Another feature of the inventive method is to operate independently from the caching algorithm. According to social preferences, location (e.g. stadium) and other variables, user skilled in the art may use different caching algorithms or may alter caching algorithms used previously.

Herein, it is sufficient for the caching algorithm to make a choice and to output this choice. The inventive method is absolutely free at deciding whether a content is cached or not. It is recommended in the state of the art that those who are skilled in the art choose an algorithm considering the request rates.

Advantageous Effects of Invention

Thus, the inventive method is offered as a collaborative caching method, wherein access points are group, user handover is triggered according to the state of the available content, the cache management is performed without any preliminary information on content popularity profiles and the cache at an access point may be fragmented into different fragments. Thus, both access speed of user to the content is increased and it is evaluated as a result of simulations that the multi-layer traffic will be reduced significantly FIG. 1 illustrates a diagram of fragmental cache concept. Accordingly, the cache 101 fragmented and then used, and it is graphically showed that fragment in which every file is located should be free from each other. Since that the most popular content is in a portion of every cache and other contents are in other portions stands out as the most effective method, it is recommended such fragmenting. Accordingly, every content is in a simple cache, thereby providing the possibility to perform a content change in base station in the group swiftly.

Figure 2:
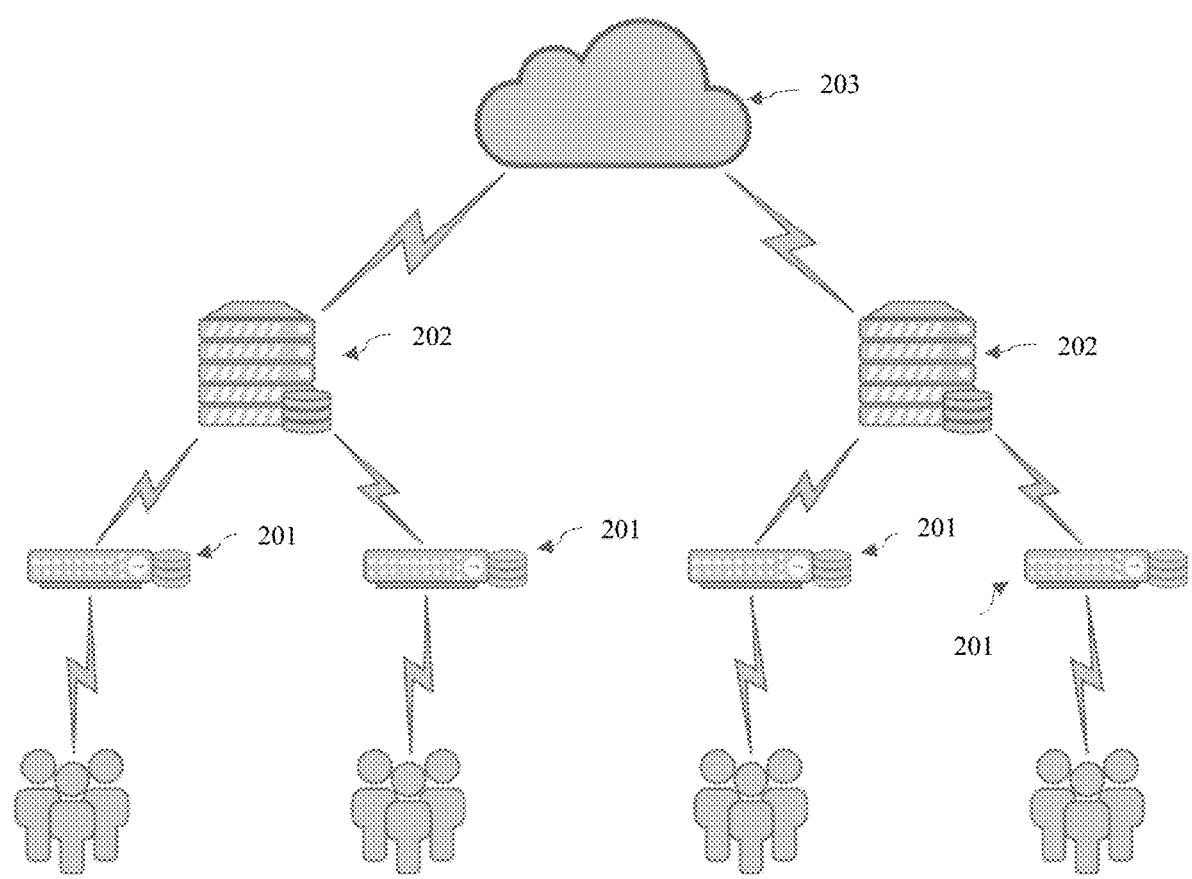
FIG. 2 illustrates an example for two-layer use.

FIG. 2 illustrates an example for two-layer use. Accordingly, every user connects to the network 203 over the first level 201. There are caches at both the first level 201 and second level 202 and also shown with the drawing.

Figure 3:
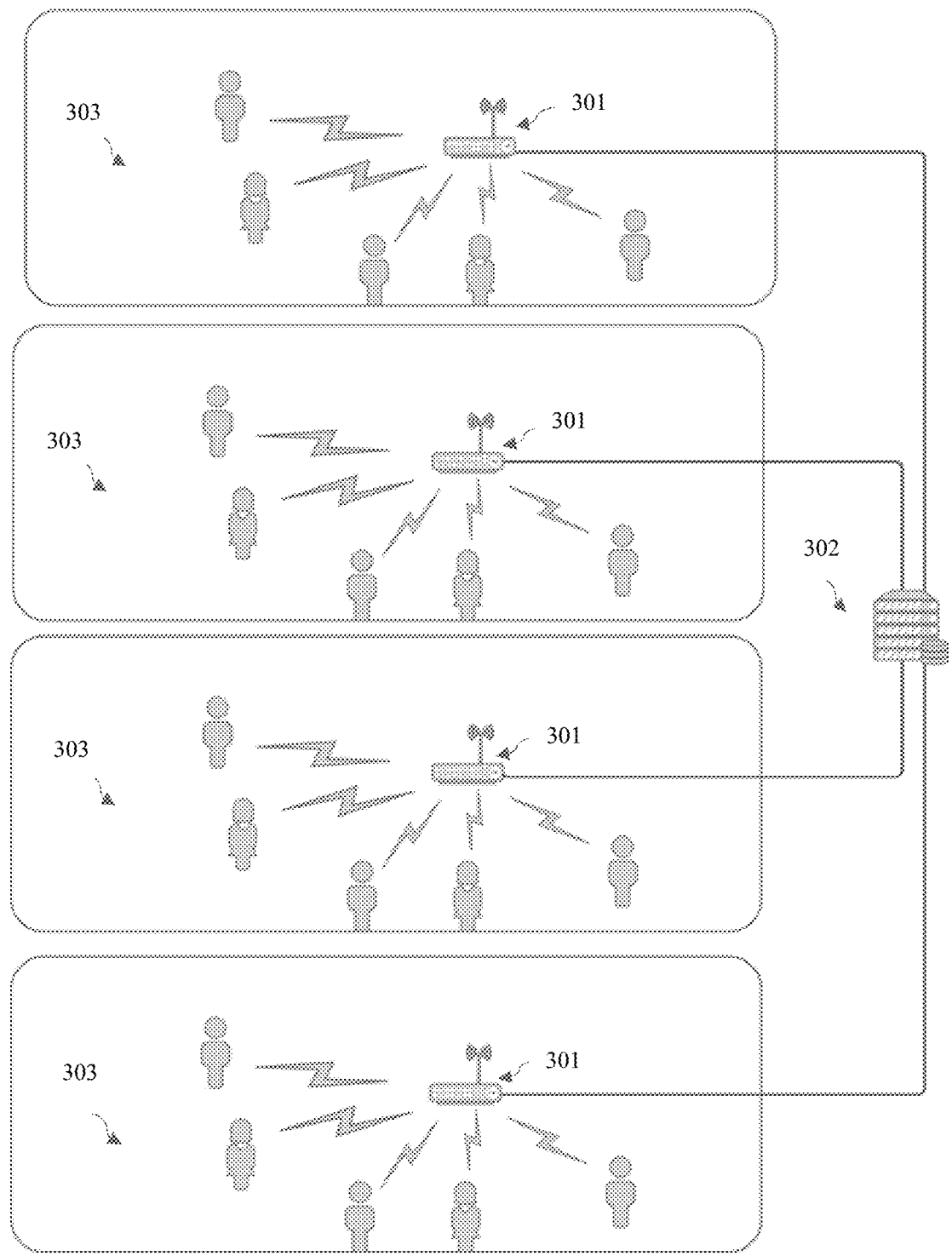
FIG. 3 illustrates an example for multi-layer network.

FIG. 3 illustrates an example for multi-layer network. Accordingly, the first level cache service group 303 connects to the network over a network gateway 301. Service is provided here for data on the cache on this network gateway 301 and provided for those unavailable over the second level. Each of users are connected to the network over a single service point 301 and they can be transmitted to other service points 301 that they can connect, when necessary.

In the embodiments of the present invention, access points are performed for two-stage cache. Accordingly, the caching algorithm firstly controls the device converges contents for the first level cache or not. Accordingly, the first level cache proceeds to the second level cache, waits depending on whether it converges or not or proceeds to the caching algorithm. Afterwards, it controls CCE and returns if it is not fallen to a proper threshold. If it is fallen to a proper threshold, it closes new requests for caching and controls the cache hit rate and returns to the initial point, if it exceeds a certain rate.

In the embodiments of the present invention, CCE performs for the two-stage cache. Accordingly, if the first level cache has converged the device contents, the caching algorithm is activated and controls whether the second level caches are converged or not. Accordingly, it closes the caching for new files and controls CCE. If hit rate of CCE is fallen to a proper threshold, the caching algorithm is activated again and returns and controls the previous step until the hit rate of CCE is fallen below a certain rate. After it is fallen, it returns to the initial point and perform the process likewise.

Even though an illustration for a second level is preferred in terms of a better description, this is one of the embodiments of the inventive method. It is obvious that the inventive method comprises characteristic applicable for network structures with desired levels. Level numbers in the examples provided throughout the description are provided for an exemplary illustration and constitute no limitation. For example, the process array given in this drawing may be easily implemented for a three-level network.

What is claimed is:

1. A method of caching in multi-layer network structures of fifth-generation (5G), wherein the multi-layer network structures include a plurality of access points, a Collaborative Caching Entity (CCE), and a content server, the method defines a four-phases cyclical process comprising:

in phase one:
a. controlling whether a first requested content is available in a cache of a first access point connected to a first user, when the first user sends a first request for the first requested content;
b. delivering the first requested content by fulfilling the first request through the first access point connected to the first user in case the first requested content is available in the cache of the first access point connected to the first user;
c. transmitting the first request to the content server over the CCE and delivering the first requested content to the first user in case the first requested content is unavailable in the cache of the first access point connected to the first user;
d. introducing the first requested content as a new file into a caching algorithm, and caching the new file in at least one of the plurality of access points according to a first result of the caching algorithm;
e. repeating steps (a)-(d) and when at least one cache of the plurality of the access points converges, the process enters phase two;

in phase two:
f. deleting, by at least one cache of the plurality of access points, a least requested file;
g. transmitting a second request to the CCE in response of a second content request requesting a second requested content by a second user, wherein the CCE detects whether there is a second access point close to the second user; when there is a second access point close to the second user, detecting whether the second requested content is available at the second access point close to the second user or at other access point of the plurality of access points; when the second requested content is available at the second access point close to the second user or at the other access point, performing a handover of the second user to the second access point close to the second user or to the other access point;
h. controlling a cache of the CCE in case the second requested content is unavailable in neither a cache of the second access point close to the second user nor a cache of the other access point; when the second requested content is available in the cache of the CCE, delivering the second requested content to the second user over the second access point close to the second user; when the second requested content is not available in the cache of the CCE, requesting the second requested content from the content server and introducing the second requested content into the caching algorithm while presenting the second requested content to the second user, wherein caching the second requested content is according to a second result of the caching algorithm;
i. repeating steps (f)-(h) and when the cache of the CCE is full or converged, the process enters phase three;

in phase three:

j. controlling a cache of a third access point close to a third user in response of a third request for a third requested content by the third user; directing the third requested content directly to the third user when the third requested content is available in the cache of the third access point close to the third user; checking whether the third requested content is available in another access point around the third user when the third requested content is not available in the cache of the third access point close to the third user; performing a handover by transmitting the third user to the another access point when the third requested content is available in a cache of the another access point;

k. controlling the cache of the CCE when the cache of the CCE is full or converged; transmitting the third requested content to the third user over the third access point close to the third user when the third requested content is not in any of the caches of the plurality of access points but in the cache of the CCE; requesting the third requested content from the content server and delivering the third requested content to the third user when the third requested content is not in any of the caches of the plurality of access points and is not in the cache of the CCE;

l. monitoring a hit rate of the CCE;

m. repeating steps (j)-(l) and when the hit rate of the CCE below a first predetermined value, the process enters phase four;

in phase four:

n. controlling a cache of a fourth access point close to a fourth user when the fourth user requests a fourth requested content; directing the fourth requested content directly to the fourth user when the fourth requested content is available in the cache of the fourth access point close to the fourth user; controlling caches of neighboring access points when the fourth requested content is not available in the cache of the fourth access point close to the fourth user; transferring the fourth user to the neighboring access points when the fourth requested content is available in the caches of the neighboring access points; delivering the fourth content request to the CCE and controlling the cache of the CCE when the fourth requested content is not available in the neighboring access points; transmitting the fourth requested content to the cache of the fourth access point close to the fourth user when the fourth requested content is available in the cache of the CCE; requesting the fourth requested content from the content server and introducing the fourth requested content into the caching algorithm in case the fourth requested content is not available in the cache of the CCE and caching the fourth requested content according to a third result of the caching algorithm;

o. monitoring the hit rate of the CCE;

p. repeating steps (n)-(o) and when the hit rate of the CCE exceed a second predetermined value, the process returns to phase one and continues to perform the steps in phase one.

* * * * *